United States Patent Office 2,927,859
Patented Mar. 8, 1960

2,927,859
ANIMAL FEEDS

Richard S. Gordon, Olivette, Mo., assignor to Monsanto Chemical Company, St. Louis, Mo., a corporation of Delaware No Drawing. Application April 30, 1956
Serial No. 581,295

12 Claims. (Cl. 99—4)

This invention relates to animal feeds, feed supplements and adjuvants for feed supplements. More particularly, the invention relates to poultry feed for obtaining optimum growth response and to supplements and adjuvants useful in the preparation of these optimum poultry feeds.

It is well known that sulfur is an essential element for sustaining animal life, and that the principal sulfur containing nutrients are the sulfur containing amino acids, such as methionine, cystine, and cysteine. The organic sulfur containing nutrients are of especial importance in prepared animal feeds, particularly those of ruminants and poultry. It is well known that sulfur in an inorganic form is beneficial in ruminant feeds, since it provides nutrients for the microfloral life in the ruminant's digestive system. Inorganic sulfur compounds have been added to experimental poultry feeds in small quantities, for example manganese sulfate and magnesium sulfate, for the purpose of providing traces of the magnesium and manganese in simulating a natural poultry feed from simple components.

The primary purpose of this invention is to provide a means of furnishing adequate sulfur in poultry feeds for producing optimum growth response. A further purpose of the invention is to provide a practical feed composition in which inexpensive inorganic sulfur containing compounds can effectively replace part of the costly sulfur amino acids. A still further purpose of the invention is to provide feed supplements and feed supplement adjuvants through the use of which optimum poultry feeds can be readily prepared from substandard feeds. The fundamental purpose of the invention is to provide a means of obtaining economical nutrient consumption from commercial feed.

It has now been found that inorganic sulfur compounds can replace part of the sulfur amino acid requirements if the poultry feed base contains less than the entire quantity of sulfur required by the poultry. Furthermore, it has been found that it is not necessary to add substantial quantities of sulfur containing amino acids, or other sulfur containing organic compounds, in order to build up the total sulfur content to that required for the proper nutrition of poultry. The organic sulfur compounds usually added to protein deficient feeds to increase the quantity of sulfur available are methionine, cystine, and cysteine, and other sulfur containing organic compounds, for example the analogues of methionine, cystine and cysteine which contain hydroxyl groups in place of the amino radicals. If the quantity of such organic sulfur compounds present is adequate to supply the required sulfur nutrient, all of the sulfur requirements of the fowl will be derived from the organic source. However, if less than an adequate amount of organic sulfur is present in the feed, a substantial portion of the total sulfur requirement can be satisfied by adding inorganic sulfur compounds to the feed mixture. It is readily apparent that the cost of providing the required amount of sulfur in feed mixtures will be greatly reduced by substituting inorganic sulfur compounds, for example sodium sulfate, in place of the more costly sulfur containing amino acids in which most basic protein feeds are deficient. Thus in the practice of this invention, feeds of very low sulfur content can be converted into superior feeds. It has been discovered that there is an absolute requirement for organic sulfur containing compounds, which cannot be satisfied with inorganic sulfur compounds, but the difference between this absolute value and the total sulfur requirement of poultry can be satisfied with either organic sulfur compounds or inorganic sulfur compounds. Thus in the practice of this inventiin it will be necessary to add sufficient sulfur in organic form to satisfy the absolute organic sulfur requirements and to supply the difference between the absolute value and the total requirements in the form of inorganic sulfur compounds.

Most poultry feeds and all commercial feeds utilize as their basic constituents vegetable products, including whole grains, such as corn, wheat, barley and milo; processed grains, such as ground grains and those from which specific compounds have been extracted, and other vegetable residues, including soybean oil meal, peanut meal and other residues from vegetable oil extraction processes. These feeds contain at least 75 percent by weight of the vegetable products in varying proportions and preferably at least 85 percent. By proper blending compositions of any desired protein content may be obtained, for example from 15 to 30 weight percent or preferably from 20 to 27 percent. However high the protein content may be, the feed will be deficient in sulfur containing amino acids, such as methionine, cystine and cysteine. Fishmeal and other animal products may be used in small quantities to increase the available organic sulfur of the feed, but amounts required to provide optimum growth for poultry are either prohibitive in cost or economically unjustifiable. As a result all practical feeds are based on the lower cost vegetable products and contain at least 75 percent by weight of these products, and usually more than 85 percent.

Although it is common practice to add organic sulfur containing compounds to feeds deficient in protein sulfur, for example methionine, the hydroxy analogue of methionine (methionine with the amino group replaced by a hydroxy group), cystine, cysteine and the corresponding hydroxy analogues of cystine and cysteine, it is impractical to add enough of these compounds to provide all of the poultry's sulfur requirements in this form. By fortifying the feed with inorganic sulfur compounds in an amount to satisfy the fowl's absolute requirement or inorganic sulfur compounds and an additional amount to replace a substantial quantity of the organic sulfur compounds, it is possible to achieve optimum development with a much smaller quantity of the costly organic sulfur compounds (sulfur amino acids and their hydroxy analogues).

The proportion of organic sulfur compounds required in the feed composition is that which will provide from 0.12 to 0.35% (based on the weight of the final diet) of sulfur which may be either in the form of naturally occurring sulfur amino acids in the protein, or supplemental organic sulfur containing compounds, such as sulfur containing amino acids or sulfur containing organic compounds readily convertible into sulfur amino acids by the metabolism of the poultry. The preferred proportion of sulfur in organic form has been found to be 0.20–0.30% of the final diet.

In the practice of this invention poultry feeds which are inherently deficient in sulfur are modified by the addition of sulfur in the form of inorganic compounds to yield a feed containing 0.02 to 0.12% of inorganic sulfur. The added sulfur compounds may be sulfates, sulfites, sulfides, thiosulfates, and even elemental sulfur. The various salts may be salts of alkali metals, alkaline earth metals or heavy metals provided that the heavy metal salts are not used in concentrations which will be toxic to the poultry. The optimum proportion of sulfur in inorganic form has been found to be from 0.04 to 0.09% of the feed.

In the preparation of poultry foods in accordance with this invention readily available by-products of food industries are generally used as the base, for example peanut meal, fish meal, cottonseed meal, soybean meal, as well as other by-products from the natural oil producing industries. Frequently whole grain meals or carbohydrates are added to increase the caloric content to form a properly balanced diet. If the poultry feed base contains a substantial quantity of the by-product meals from the natural oil producing industries, the content of sulfur containing amino acids is too low to provide an optimum poultry feed. Feed bases of this type are adaptable to the practice of this invention and by adding sufficient organic sulfur compounds and sufficient inorganic sulfur compounds to bring the organic and inorganic content to within the prescribed limits, feeds which will provide maximum growth response at a minimum cost will be obtained.

A useful modification of this invention is a feed stock supplement which can be added to the protein containing waste materials or by-products which are deficient in the essential sulfur containing amino acids to convert them into optimum poultry feeds. Such feed supplements will contain organic sulfur compounds, such as the essential amino acids and/or other sulfur containing organic compounds, particularly the sulfur containing amino acid analogues having hydroxyl groups in place of the amino radicals, and in addition a substantial proportion of the inorganic sulfur containing compound. Useful feed supplements may contain from 5 to 80% of its sulfur in the form of organic compounds and from 20 to 95% of its sulfur in the form of inorganic compounds. It will be apparent that the distribution of sulfur in organic and inorganic form will depend upon the extent of sulfur containing protein deficiency in the basic feed stock. For example, feeds which are very deficient in organic sulfur will respond readily by the addition of supplements in which 50 to 80% of the sulfur is in organic form and 20 to 50% of the sulfur is in inorganic form. However, feeds which are only moderately deficient may be converted into optimum feeds by the use of supplements in which 5 to 50% of the sulfur is in the form of organic compounds and 50 to 95% is in the form of inorganic sulfur compounds.

The feed supplements will contain sulfur containing compounds as a substantial part of the composition, for example at least 20 percent by weight of the total supplement. Preferred supplements will contain at least 50 percent by weight of sulfur containing compounds of which from 20 to 75 percent of the total sulfur is in the form of organic compounds, particularly methionine, cystine, cysteine, the analogues of these amino acids wherein a hydroxy group has replaced the amino group, and water soluble salts of the said amino acids and the hydroxy analogues of the amino acids, particularly the sodium, calcium and ammonium salts. Supplements of this type are useful as additives to feeds comprising at least 75 percent by weight of the nutrient components in the form of vegetable compounds.

It is apparent that other known sulfur containing compounds or compositions may be added to the supplement in the manner well known in the poultry raising art. It is conventional to incorporate vitamins, minerals, antibiotics, anthelmintics, and other medications in poultry feeds. Thus the feed supplements containing both organic and inorganic sulfur may incorporate many or all of these adjuvants and may in addition include substantial quantities of filler or diluent which facilitate the mixing and distribution of the functional components of the feed supplements.

The mixture of organic and inorganic sulfur compounds may be regarded as an adjuvant for the purpose of subsequent incorporation with vitamins, minerals, antibiotics, anthelmintics, and the suitable diluents for the purpose of preparing a feed supplement for use by poultry raisers.

Further details in the practice of this invention are set forth in the following examples.

*Example 1*

One month old chicks raised on a commercial 20% protein feed were divided into four groups of equal weight. Two groups were continued on the same commercial feed for four additional weeks, while the other two groups were given the same feed supplemented with 0.45% sodium sulfate. The following table shows the cumulative weight gain (C.G.); the feed efficiency (F.E.=wt. feed consumed/wt. gain); and the production efficiency (P.E.= C.G./F.E.).

|  | C.G. | F.E. | P.E. |
| --- | --- | --- | --- |
| Control | 1,014 | 2.60 | 394 |
| +0.45 Na₂SO₄ | 1,042 | 2.41 | 433 |

*Example 2*

Using a feed containing 24.5% protein and 0.58% sulfur amino acids (0.13% S) chicks were grown as described in the preceding examples. The feathering was determined by an arbitrary procedure. The feathering of each fowl was classified in one of four general groups assigned numerical values as follows:

1—Poor
2—Fair
3—Good
4—Perfect

The classifications were made by at least two individuals and the average values for each group of birds is indicated as the "Feather score." The following table sets forth the critical data observed.

|  | C.G. | F.E. | P.E. | Feather Score |
| --- | --- | --- | --- | --- |
| Control | 318 | 2.09 | 152 | 1.2 |
| 0.2% Na₂SO₄—0.045% S | 429 | 1.75 | 245 | 2.3 |
| 0.5% Na₂SO₄—0.11% S | 425 | 1.75 | 243 | 3.6 |

*Example 3*

Example 2 was repeated with 24.5% protein containing 0.69% sulfur amino acids (0.16% S).

|  | C.G. | F.E. | P.E. | Feather Score |
| --- | --- | --- | --- | --- |
| Control | 473 | 1.73 | 273 | 1.8 |
| 0.2% Na₂SO₄—0.045% S | 499 | 1.86 | 267 | 2.7 |
| 0.5% Na₂SO₄—0.11% S | 472 | 1.67 | 283 | 3.6 |

This application is a continuation-in-part application of abandoned application Serial No. 507,495, filed May 10, 1955.

What is claimed is:

1. A poultry feed containing at least 75 percent by weight of nutrient components in the form of vegetable compounds, organic sulfur compounds of the group consisting of sulphur amino acids and hydroxy analogues thereof in an amount sufficient to provide from 0.12 to 0.35 percent of organic sulfur in the total feed, and inorganic sulfur compounds in an amount sufficient to provide from 0.02 to 0.12 percent of inorganic sulfur in the total feed.

2. A poultry feed containing at least 75 percent by weight of vegetable compounds selected from the group consisting of whole grains, processed grains and oil expressed vegetable matter; organic sulfur compounds selected from the group consisting of methionine, cystine, cysteine, the hydroxy analogue of methionine, the hydroxy analogue of cystine, the hydroxy analogue of cysteine and the water-soluble salts of these acids in an amount sufficient to provide in the total feed from 0.12 to 0.35 percent of sulfur in organic form; and inorganic non-toxic compounds selected from the group consisting of sulfur, metal sulfides, metal sulfates, metal thiosulfates and metal sulfites in an amount sufficient to provide from 0.02 to 0.12 percent of inorganic sulfur in the total feed.

3. A poultry feed containing at least 85 percent by weight of nutrient components in the form of vegetable compounds, organic sulfur compounds of the group consisting of sulphur amino acids and hydroxy analogues thereof in an amount sufficient to provide from 0.20 to 0.30 percent of organic sulfur in the total feed, and inorganic sulfur compounds in an amount sufficient to provide from 0.04 to 0.09 percent of inorganic sulfur in the total feed.

4. A poultry feed containing at least 85 percent by weight of vegetable compounds selected from the group consisting of whole grains, processed grains and oil expressed vegetable matter; organic sulfur compounds selected from the group consisting om methionine, cystine, cysteine, the hydroxy analogue of methionine, the hydroxy analogue of cystine, the hydroxy analogue of cysteine and the water-soluble salts of these acids in amount sufficient to provide in the total feed from 0.20 to 0.30 percent of sulfur in organic form; and inorganic non-toxic compounds selected from the group consisting of sulfur, metal sulfides, metal sulfates, metal thiosulfates and metal sulfiites in an amount sufficient to provide from 0.04 to 0.09 percent of inorganic sulfur in the total feed.

5. A poultry feed supplement containing at least 20 percent by weight of sulfur containing compounds, 5 to 80 percent of the sulfur of which compounds is in organic form and present in compounds selected from the group consisting of methionine, cystine, cysteine, the hydroxy analogue of methionine, the hydroxy analogue of cystine, the hydroxy analogue of cysteine and the water-soluble salts thereof; and 20 to 95 percent of the sulfur of which compounds is in the form of inorganic compounds, selected from the group consisting of sulfur, metal sulfides, metal sulfates, metal thiosulfates and metal sulfites.

6. A poultry feed supplement containing at least 50 percent by weight of sulfur containing compounds, 20 to 75 percent of the sulfur of which compounds is in the form of organic compounds selected from the group consisting of methionine, cystine, cysteine, the hydroxy analogue of methionine, the hydroxy analogue of cystine, the hydroxy analogue of cysteine, and the water-soluble salts thereof; and 25 to 80 percent of the sulfur is in the form of inorganic compounds selected from the group consisting of sulfur, metal sulfides, metal sulfates, metal thiosulfates and metal sulfites.

7. A method of preparing a poultry feed composition which comprises adding to a feed stock containing at least 75 percent of vegetable nutrient, sufficient sulfur containing organic compounds of the group consisting of sulphur amino acids and hydroxy analogues thereof so as to provide from 0.12 to 0.35 percent of sulfur in organic form in the complete feed, and sufficient sulfur containing inorganic compounds so as to provide from 0.02 to 0.12 percent of sulfur in inorganic form in the final feed.

8. A method of preparing a poultry feed composition which comprises adding to a feed stock containing at least 75 percent of its nutrient from vegetable sources, sufficient sulfur containing organic compounds of the group consisting of methionine, cystine, cysteine, the hydroxy analogue of methionine, the hydroxy analogue of cystine, the hydroxy analogue of cysteine, and the water-soluble salts thereof so as to provide from 0.12 to 0.35 percent of sulfur in organic form in the complete feed; and sufficient inorganic sulfur containing compounds of the group consisting of sulfur, metal sulfides, metal sulfates, metal thiosulfates and metal sulfites so as to provide from 0.02 to 0.12 percent of sulfur in inorganic form in the final feed.

9. A method of preparing a poultry feed composition which comprises adding to a feed stock containing at least 85 percent of vegetable nutrient, sufficient sulfur containing organic compounds of the group consisting of sulphur amino acids and hydroxy analogues thereof so as to provide from 0.20 to 0.30 percent of sulfur in organic form in the complete feed, and sufficient sulfur containing inorganic compounds so as to provide from 0.04 to 0.09 percent of sulfur in inorganic form in the final feed.

10. A method of preparing a poultry feed composition which comprises adding to a feed stock containing at least 85 percent of its nutrient from vegetable sources, sufficient sulfur containing organic compounds of the group consisting of methionine, cystine, cysteine, the hydroxy analogue of methionine, the hydroxy analogue of cystine, the hydroxy analogue of cysteine, and the water-soluble salts thereof so as to provide from 0.20 to 0.30 percent of sulfur in organic form in the complete feed; and sufficient inorganic sulfur containing inorganic compounds of the group consisting of sulfur, metal sulfides, metal sulfates, metal thiosulfates and metal sulfites so as to provide from 0.04 to 0.09 percent of sulfur in inorganic form in the final feed.

11. A poultry feed supplement containing at least 20% by weight of sulfur containing compounds, 5% to 80% of the sulfur being present in the form of compounds of the group consisting of sulfur amino acids and hydroxy analogues thereof, and 20% to 95% of the sulfur being present in the form of inorganic compounds.

12. A poultry feed supplement containing at least 50% by weight of sulfur containing compounds, 20% to 75% of the sulfur being present in the form of compounds of the group consisting of sulfur amino acids and hydroxy analogues thereof, and 25% to 80% of the sulfur being present in the form of inorganic compounds.

References Cited in the file of this patent

UNITED STATES PATENTS

| | | |
|---|---|---|
| 2,676,104 | Blake et al. | Apr. 20, 1954 |
| 2,802,736 | Colby | Aug. 13, 1957 |